United States Patent [19]

Hedberg

[11] Patent Number: 5,054,038
[45] Date of Patent: Oct. 1, 1991

[54] METHOD AND APPARATUS FOR RESTORING DATA

[75] Inventor: Mats O. J. Hedberg, Haninge, Sweden

[73] Assignee: Telefonaktiebolaget L M Ericsson, Stockholm, Sweden

[21] Appl. No.: 429,651

[22] Filed: Oct. 31, 1989

[30] Foreign Application Priority Data

Nov. 18, 1988 [SE] Sweden .............................. 8804196

[51] Int. Cl.$^5$ ........................................... H03K 5/159
[52] U.S. Cl. ................................... 375/118; 307/595; 328/155
[58] Field of Search ............... 375/106, 107, 118, 119; 307/591, 595, 597; 333/139; 328/72, 155; 377/104; 455/138, 139

[56] References Cited

U.S. PATENT DOCUMENTS

| | | | |
|---|---|---|---|
| 4,190,807 | 2/1980 | Weber | 328/155 |
| 4,626,716 | 12/1986 | Miki | 307/590 |
| 4,695,805 | 9/1987 | Massingill et al. | 328/155 |
| 4,755,704 | 7/1988 | Flora et al. | 307/591 |
| 4,829,258 | 5/1989 | Volk et al. | 328/155 |
| 4,922,141 | 5/1990 | Lofgren et al. | 307/595 |

FOREIGN PATENT DOCUMENTS 1355495 8/1971 United Kingdom .
1373522 2/1972 United Kingdom .

Primary Examiner—Benedict V. Safourek
Attorney, Agent, or Firm—Burns, Doane, Swecker & Mathis

[57] ABSTRACT

The invention relates to a method and apparatus for restoring at least one data signal with the aid of a clock signal. In the method at least two signal delays are arranged with time delays adjustable in steps such that their time steps are given substantially the same responsiveness to at least one ambience factor, e.g. temperature. The first signal is delayed with the aid of a first signal delay. A first restored data signal is created by sensing the delayed first signal at given times determined by the clock signal. The results of sensing at different times are compared and the delay of the first signal delay is varied stepwise by varying the number of time steps in response to the comparison. A second signal delay is used for relating a plurality of time steps to the clock signal period time. The magnitude of time steps in both the first and second signal delay is controlled synchronously in response to the relating process so that the magnitude of a time step is in a given relationship to the clock signal period time. An apparatus in accordance with the invention includes, apart from the signal delays, first and second sensing, comparison and control elements connected to the signal delays.

13 Claims, 6 Drawing Sheets

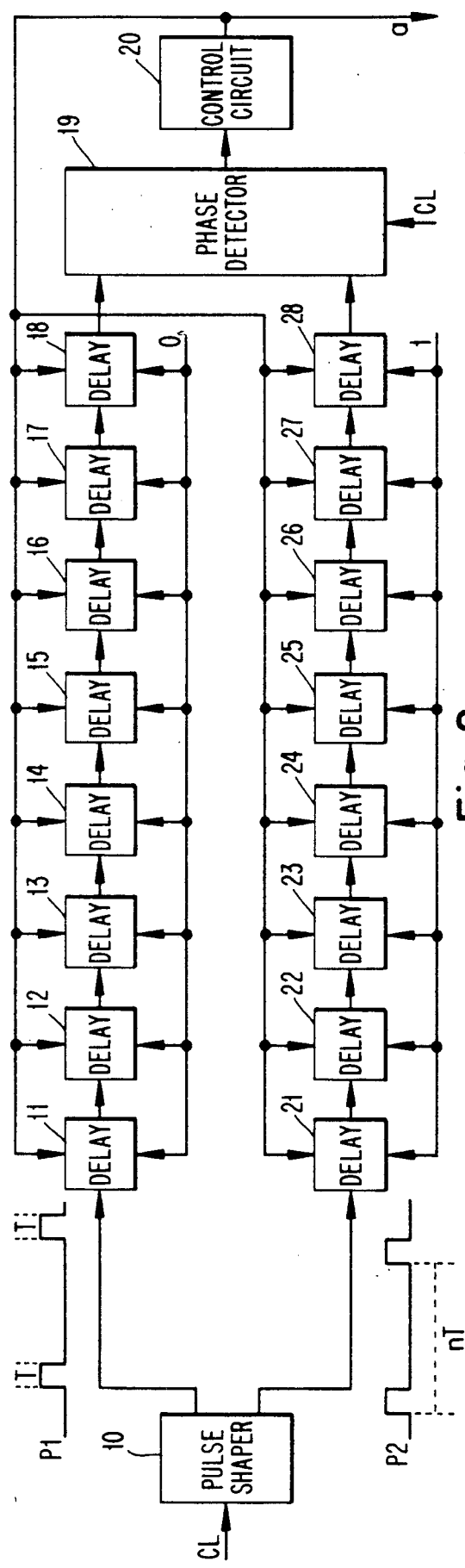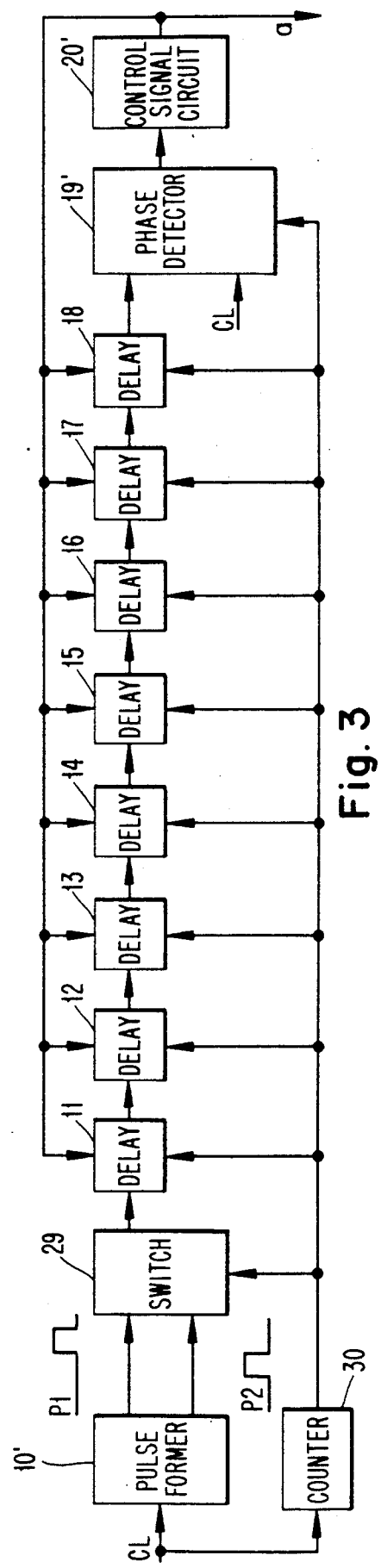
Fig. 2
Fig. 3

METHOD AND APPARATUS FOR RESTORING DATA

TECHNICAL FIELD

The present invention relates to the field of signal processing. More specifically, the invention relates to a method and apparatus for regenerating or restoring a data signal with the aid of an available, periodic clock signal.

BACKGROUND ART

Data signals which have been generated with a certain shape tend to become distorted during propagation in electrical circuits. After having passed through one or more electrical circuits, the data signal is given a time sequence which more or less deviates from the time sequence it was given when it was generated. For binary data signals it is usual that the distortion appears, inter alia, in the form of pulse ratio changes and jitter. Distortion in data signals can be caused by band limitations, crosstalk, reflections and other physical imperfections or limitations in electrical equipment.

In systems where data signals are to propagate via a plurality of circuits and in certain other connections, the distortion can be so great that at one or more places it is necessary to restore the data signals so as not to risk that their capacity for carrying information shall be lost. There are several known methods and apparatus for more or less reconstructing or restoring data signals, particularly binary signals with data timing corresponding to a clock signal frequency.

An automatic phase correction circuit for phasing in a data signal relative to a clock signal is summarily described in the article "BROADBAND SWITCHING NETWORK AND TV SWITCHING NETWORK FOR 70 MBIT/S" by K. D. Langer, F. Lukanek, I. Vathke och and G. Walf, Heinrich-Hertz-Institut für Nachrichtentechnik Berlin GmbH, 1000 Berlin, Federal Republic of Germany. The phase correction circuit includes a signal delay means, sensing means and a phase detector. The phase correction circuit is said to function in principle so that it switches in and switches out delay elements.

Apparatus for restoring a data signal and phasing it in relative a clock signal is described in "HIGH SPEED (140 MBIT/S) SWITCHING TECHNIQUES FOR BROADBAND COMMUNICATION", by D. Boettle and M. Klien, Standard Electric Lorenz AG (SEL), Research Center 7000 Stuttgart, Federal Republic of Germany. The apparatus includes an adjustable delay circuit connected for receiving and delaying the data signal which is to be restored. The apparatus also includes a phase detector connected for receving the clock signal and the delayed data signal. In addition, the apparatus includes control logic connected to the phase detector and delay line. The phase detector senses the delayed signal at three or five sensing times determined by the clock signal. The control logic changes the delay of the delay line stepwise in response to the result of this sensing. Each step is approximately 1 nS and the maximum delay of the delay line is approximately 7 nS, which approximately corresponds to one period of the clock signal at the frequency of 140 Mbit/s.

DISCLOSURE OF THE INVENTION

A problem in certain known methods and apparatus for restoring or regenerating a data signal is that they are not adaptive or readily adjustable to different data speeds.

Another problem in certain known methods and apparatus for regenerating or restoring a data signal is that they are sensitive to temperature and voltage variations as well as scatter in parameters in the manufacture of required means.

A further problem in certain known methods and apparatus for regenerating or restoring a data signal is that they have certain difficulties in following dynamic phase alterations in the data signal without information being lost.

Yet another problem in certain known methods and apparatus for restoring or regenerating several data signals with the aid of the same clock signal is that they have certain difficulties in coordinating certain operations in the restoration such that restoration or regeneration is made more efficient, with lower cost per data signal as a result.

The invention has the object of solving these problems and enabling a method and apparatus for restoring or regenerating at least a first data signal with the aid of a clock signal.

What is distinguishing for a method and apparatus in accordance with the invention, and particularly preferred embodiments thereof is disclosed in the independent and dependent claims.

Somewhat simplified, it could be said that in a method in accordance with the invention at least two signal delay means are arranged with time delay having adjustable time steps so that their time steps are given substantially the same response to at least one ambience factor, e.g. temperature. The first signal is delayed with the aid of a first of the signal delay means. A first restored signal is created by sensing the delayed first signal at certain first times determined by the clock signal.

The results of sensing at different sensing times is compared, and the delay of the first signal by the first signal delay means is varied stepwise by variation of the number of time steps in response to the comparison. The second signal delay means is used for relating a plurality of time steps to the period time of the clock signal. The time step magnitude of both the first and the second signal dealy means is controlled synchronously in response to the relation so that the magnitude of one time step is in a given relationship to the clock signal period time.

In the relating procedure there are preferably created two relating signals from the clock signal so that they are given a period time and a mutual phase position in response to the clock signal period time. One relating signal is delayed a given number of time steps in relation to the other signal. The phase positions of the two relating signals after the delay are compared and the magnitude of a time step is controlled in response to their mutual phase position. For the mutual delay of the relating signals, two delay devices can be optionally utilized in the second signal delay means. In this case, the delay devices are arranged such that their time steps are given substantially the same amplitude and response to ambience as the first signal delay means.

A method in accordance with the invention can be preferably utilized for also restoring a second data signal and to phase also the second data signal in relation to the available clock signal. In such a case the second signal is delayed with the aid of a third signal delay means. A second restored signal is created by sensing the delayed second data signal at certain second sensing times determined by the clock signal. The results of sensing the second data signal at different second sensing times are compared with each other. Finally, the delay of the second signal by the third signal delay means is varied stepwise by varying the number of time steps in response to the result of the comparison.

Somewhat simplified, it could be said that an apparatus in accordance with the invention includes at least two signal delay means with signal time delays adjustable in equally as great time steps of controllable magnitude. The first of the signal delay means is connected for receiving and delaying the first data signal. A first sensing means is connected for receiving the first data signal delayed by the signal delay means, and the first signal comparison means senses the delayed first data signal at given first sensing times determined by the first clock signal. A first comparison or control means is connected for comparing the results of the sensing of the delayed first data signal and for controlling the number of time steps in the delay of the first data signal by the first signal delay means in response to the result of the sensing.

A second signal delay means in the apparatus is arranged such that its time steps are given substantially the same response to an ambience factor as the first signal delay means. The apparatus also includes a second comparison and control means coupled to the first and the second signal delay means. The second comparison and control means relates a first magnitude representing the magnitude of the clock signal period time or a part of it to a second magnitude representing the magnitude of a plurality of time steps in the second signal delay means. In addition, the second comparison and control means controls the magnitude of the time steps in the signal delay means synchronously so that they are in a given relationship to the clock signal period time.

The first and second magnitudes preferably constitute the phase difference between two relating signals.

An apparatus in accordance with the invention preferably includes means for creating from the clock signal first and second relating signals which have a period time and a mutual phase position depending on the clock signal period time. The second signal delay means is then connected for achieving that one of the relating signals will be delayed by a given number of time steps in relation to the other relating signal. In the relation the second comparison and control means then compares the phase position of the two relating signals after the delay with each other and controls the magnitude of the time steps in the signal delay means in response to the result of the phase comparison.

The second signal delay means preferably includes two delay devices of a similar type as in the first signal delay means, arranged so that their time steps are given substantially the same magnitude and response to at least one ambience factor as the time steps of first signal delay means. The apparatus then includes means for creating from the clock signal a first and a second relating signal, these signals having a period time and a mutual phase position depending on the clock signal period time. Here, the two delay devices are connected for delaying their respective relating signal by different delay times differing by a given number of time steps. In the relation process, the second comparison and control means then compares the phases of the two relating signals after the delays and controls the magnitude of the time steps in the signal delay means in response to the result of the phase comparison.

The signal delay means are preferably manufactured in the form of an integrated circuit, and are supplied with energy from a common voltage source.

An inventive apparatus is preferably formed for also restoring a second data signal and phasing in this second data signal relative to the available clock signal. A third signal delay means is then connected in the apparatus for receiving and delaying the second signal. In addition, a third sensing means is connected for receiving the clock signal and the second data signal delayed by the third signal delay means, the latter sensing the delayed second signal at given second sensing times determined by the available clock signal. A third comparison and control means is connected for comparing the results of the sensing and is also connected to the third signal delay means for controlling the number of time steps in the delay of the second signal by the third signal delaying means in response to the results of sensing the second data signal. Finally, the second comparison and control means is connected for also controlling the magnitude of the time steps in the third signal delaying means synchronously with the time steps in the first and second signal delay means.

A method and apparatus in accordance with the invention and particularly preferred embodiments thereof primarily has the following advantages, which are accentuated in the preferred embodiments.

The restoration functions well, and adjusts itself automatically to different data speeds and clock frequencies within certain limits. Within certain limits the restoration will be more or less insensitive for scatter in parameters, temperature and voltage variations of the means used.

It is possible to follow dynamic phase alterations in the data signal without data being lost.

Resolution between the different sensing times can be automatically constant relative the clock signal period time.

Further advantages will be understood by one skilled in the art after having studied the following description of preferred embodiments.

BRIEF DESCRIPTION OF DRAWINGS

FIGS. 2-4 illustrate embodiments of means which can be included in an apparatus according to FIG. 1, FIGS. 5-6 illustrate sensing data signals with the pulse ratio one and which are delayed equally.

BEST MODES FOR CARRYING OUT THE INVENTION

Figure 1:
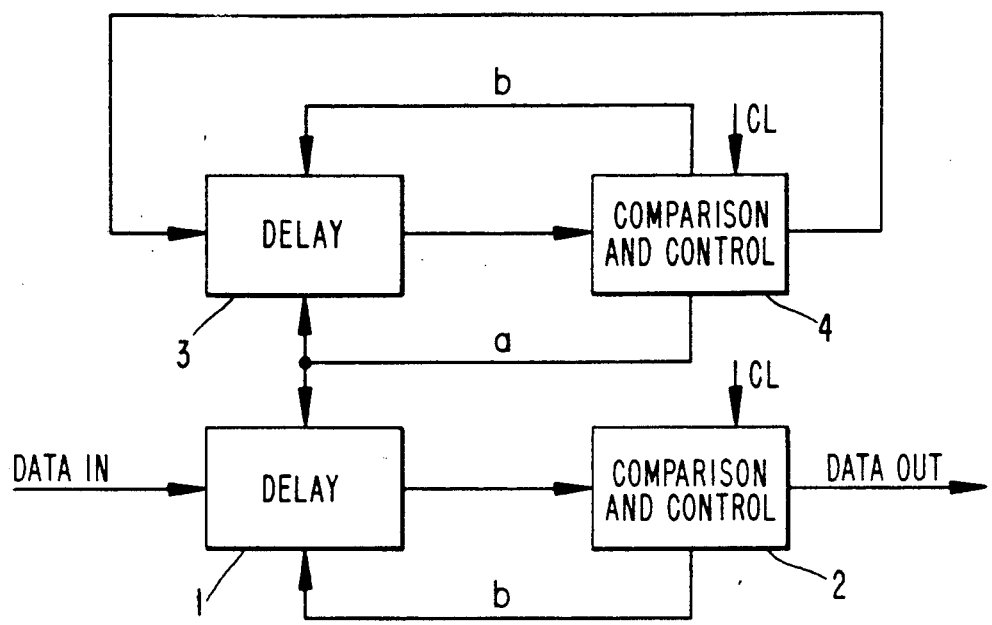
FIG. 1 illustrates, heavily simplified, an embodiment of an apparatus for carrying out restoration of a data signal in accordance with the invention.

In FIG. 1 there is illustrated, heavily simplified, an apparatus in accordance with the invention for restoring a data signal and phasing it in relative to a periodical clock signal CL. The apparatus includes first signal delay means 1, first sensing, comparison and control means 2, second signal delay means 3 and second comparison and control means 4.

The first signal delay means 1 has in FIG. 1 a signal input, a signal output and control inputs. The first signal delay means is connected and implemented for receiving a data signal DATA IN, which is to be restored, and sending this data signal to the means 2 with a given signal delay. The magnitude of the signal delay can be altered stepwise in substantially equal time steps via a first control input. The common magnitude of the time steps is controllable via a second control input.

Means 2 are connected for receiving the clock signal CL and include sensing means connected and implemented for receiving the delayed data signal. The sensing means senses the delayed data signal at given first sensing times determined by the clock signal.

Means 2 also includes first comparison and control means connected and implemented for comparing the results of sensing the delayed data signal at given sensing times. The first comparison and control means has a control output connected to the first control input of the means 1 and is implemented for controlling the number of time steps in the signal delay of the first signal delay means in response to the results of the sensing.

As with the first signal delay means the second signal delay means 3 has in FIG. 1 a signal input, a signal output and control inputs. The signal input of means 3 is connected to the means 4 for receiving signals from means 4. The signal output of means 3 is connected to means 4 for resending to means 4 received signals with a given signal delay. The magnitude of the signal delay can be changed stepwise in substantially equal time steps via a first control input. The common magnitude of the time steps is controllable.

The second signal delay means are arranged such that the time steps have substantially the same response to ambient temperature, feed voltage and other ambience factors as the time steps of the first signal delaying means.

The comparison and control means 4 is connected for receiving the clock signal CL and for receiving delayed signals from the second signal delay means 3. In addition, the means 4, has one control output connected to the first control input of the second signal delay means and another control output connected to the second control inputs of both the first and the second signal delaying means.

The second comparison and control means 4 relates a first magnitude respresenting the magnitude of the clock signal period time or a part thereof to a second magnitude representing the magnitude of a selected number of time steps in the second signal delay means. In response to the relation, the second comparison and control means controls the magnitude of the time steps in both signal delaying means synchronously so that they are in a definite relationship to the clock signal period time.

In FIG. 2 there is illustrated a first embodiment of second signal delay means and associated comparison and control means. The means include a pulse shaper 10, a first series-connected group of delaying elements 11-18 constituting a first delay device, a second series-connected group of delaying elements 21-28 constituting a second delay device, a phase detector 19 and a control signal circuit 20.

The pulse shaper has an input connected for receiving the clock signal CL, a first output connected to a signal input of the delaying element 11 and a second output connected to a signal input on the delaying element 21.

The delaying elements are mutually alike. Each element has a signal input and a signal output, a binary control input for time steps and an analogue control input for step magnitude. Each delaying element has a signal delay which can be altered by one time step by changing a binary signal on its binary control input. The magnitude of this time step can be controlled analogously with an analogue control signal a on its analogue control input.

In FIG. 2, all delaying elements in both groups (both devices) are fed with the same analogue control signal a on their analogue control inputs. All delaying elements therefore have the same step magnitude. The eight delaying elements 11-18 of the first device are fed with a binary control signal with the logical value 0 on their binary control inputs, while the eight delaying elements 21-28 of the second device are fed with a binary signal with the logical value 1 on their binary control inputs. Together, the eight delaying elements 11-18 in the first group therefore achieve a delay of signals from the pulse shaper to the phase detector which differ by eight time steps from the delay which the delaying elements 21-28 together achieve with signals from the pulse shaper to the phase detector.

The pulse shaper generates on its first output a pulse train comprising pulses with an equivalent width corresponding to the clock signal period time T and with equivalent mutual spacing corresponding to a plurality of period times nT of delaying elements in a device.

On its second output the pulse former generates a pulse train which is time-shifted but otherwise in agreement with the pulse train on the first output of the pulse former. The time shift between the pulse trains on the pulse former outputs corresponds to a period time T of the clock signal.

The phase detector 19 has a first input connected to the signal output of the delaying element 18 and the second input connected to the signal output of the delaying element 28. The detector generates on its output an output signal representing the time shift between pulses received on the first input and corresponding pulses received on the second input.

The group of delaying elements 21-28 which have a signal delay eight time steps shorter than the delay of the other group is connected to the output of the pulse former which sends the pulse train which is time-shifted a clock pulse period after the pulse train on the other output. The first delaying element 11 in the group which has a longer delaying time therefore receives a pulse from the pulse former 10 one clock signal period before the first delaying element 21 in the group which has a shorter delaying time receives the corresponding pulse from the pulse former.

With respect to the arrival time to the phase detector, the time shift between the pulse trains on the pulse shaper outputs therefore counteracts the difference in time delay between the groups of delaying elements in the devices. If the time shift between the pulse trains on the pulse shaper outputs agrees with the difference between the signal delays of the first and second devices (groups) then corresponding pulses arrive simultaneously to the phase detector inputs.

The control circuit 20 receives the output signal from the phase detector and generates in response to this signal an analogue control signal a for controlling the step magnitude of all delaying elements in both groups.

The same analogue control signal also controls the step magnitude in the first signal delay means 1 in FIG. 1.

The signal from the phase detector indicates which of its inputs receives the pulses first and which of the inputs receives pulses last. With the analogue control signal a the control signal circuit strives to control the step magnitudes so that corresponding pulses arrive simultaneously to the phase detector inputs, which will be the case when the clock signal period time agrees with eight time steps. The control signal circuit therefore functions in co-action with the phase detector as a regulator for regulating the step magnitude according to the clock signal period time. The control signal circuit preferably has a proportional and integrating regulating function.

In an apparatus according to FIG. 1, the whole of the combination of signal delay means and comparison and control means illustrated in FIG. 2 has the task of controlling the step magnitude in the first signal delay means so that it is in a given relationship to the clock signal period time. FIG. 3 illustrates an alternative embodiment of a combination of signal delay means and comparison and control means having the same task.

The means in FIG. 3 include a pulse former 10' of the same type as in FIG. 2, a switch 29, a group of eight series-connected delaying elements 11-18 of the same type as in FIG. 2 constituting a delay device, a phase detector 19', a control signal circuit 20' with the same task as the control circuit in FIG. 2, and a counter 30.

The counter 30 has an output for a binary control signal connected to a control input on the switch 29, a control input on the phase detector 19' and to the binary control inputs on the delaying elements 11-18. The counter 30 receives the clock signal and counts its periods, as well as regularly changing the logical binary value of its binary control signal after a given number of clock signal periods.

The pulse shaper 10' generates on its outputs mutually time displaced pulse trains with period times corresponding to the changes in the logical binary value of the counter's binary control signal. The switch 29 transfers pulses from one input of the pulse shaper to the delaying element 11 when the binary control signal has a given logical value and from the pulse shaper's second input to the delaying element 11 when the binary control signal has the opposite logical value. The delaying element 11 will therefore alternately receive pulses from one and the other output on the pulse shaper. Depending on the value of the binary signal, each delaying element 11-18 will delay a pulse either with a short or a longer time delay. The difference between the short and the longer delay in a delaying element is one time step. The changes in the binary control signal are adjusted to the pulse trains on the pulse former outputs so that pulses from one output of the pulse shaper to the phase detector are delayed by the delaying elements 11-18 eight time steps more than pulses from the other output of the pulse shaper to the phase detector. The time shift between pulses from different outputs on the pulse shaper have therefore been increased or decreased by eight time steps when the pulses arrive at the phase detector.

The phase detector 19' generates on its output an output signal representative of the time delay between received pulses, this delay being in response to the time delay between corresponding pulses on the pulse shaper outputs and also to the magnitude of eight time steps in the delay device.

The control signal circuit 20' recives the output signal from the phase detector and generates in response to this output signal an analogue control signal a for controlling the step magnitude of all delaying elements 11-18 in the delay device. The same analogue control signal a also controls the step magnitude of the first signal delay means 1 in FIG. 1. With the analogue control signal a the control signal circuit strives to control the step magnitude so that eight time steps correspond to a clock signal period. The control signal circuit preferably has here a proportional and integrating regulating function.

Figure 4:
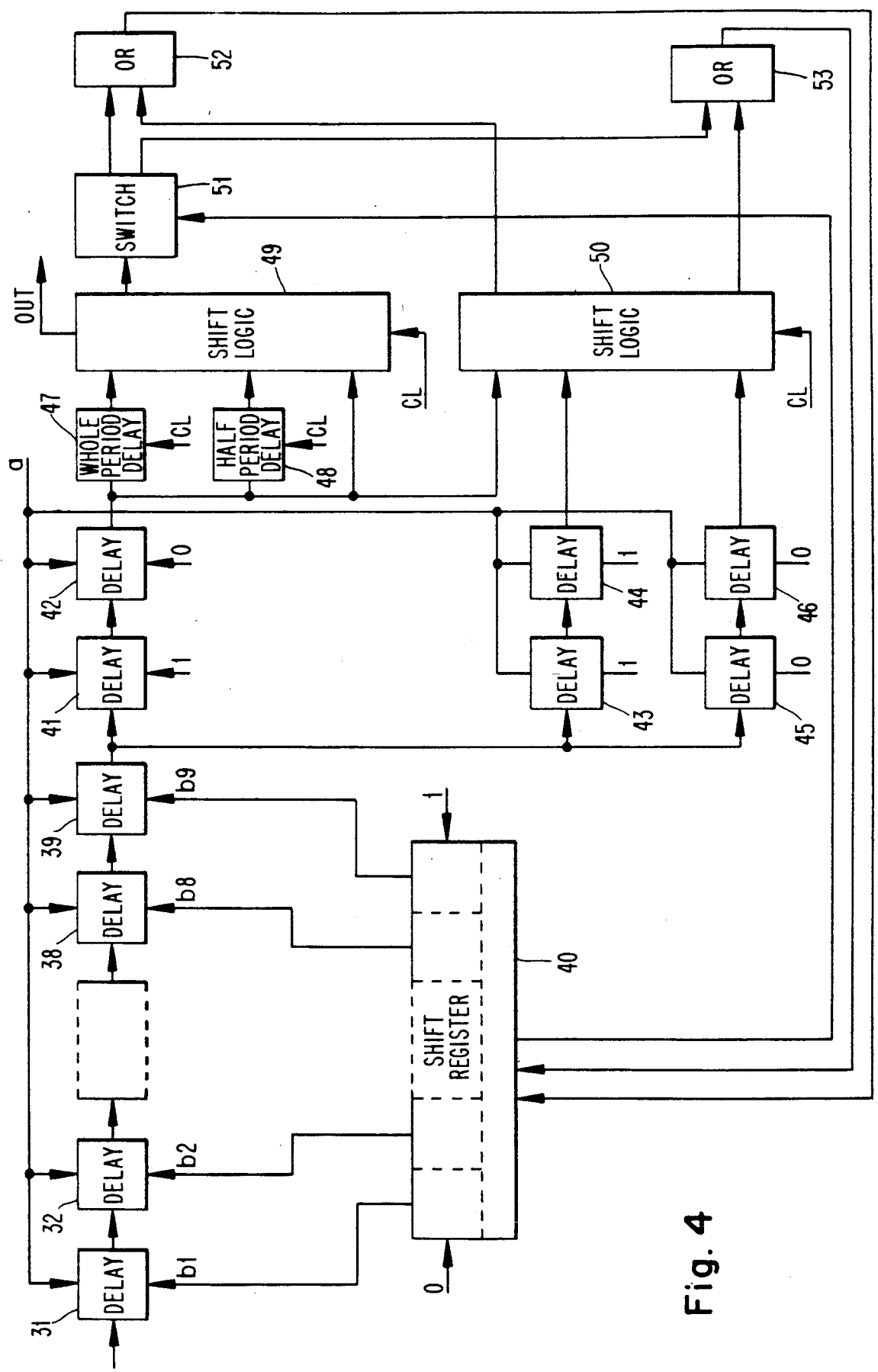

In FIG. 4 there is illustrated an embodiment of first signal delay means and associated sensing, comparison and control means. The means include a group of nine series-connected delaying elements 31-39 of the same type as elements 11-18 and 21-28 in FIGS. 2-3, a shift register 40, three groups each having two series-connected delaying elements 41-46 of the same type as elements 11-18 and 31-38, a whole period delaying element 47, a half period delaying element 48, first shift logic 49 for the half period shift, second shift logic 50 for the time step shift, a switch 51, a first OR gate 52 and a second OR gate 53.

All delaying elements 31-39 and 41-46 are supplied with the same analogue control signal a as the delaying elements 11-18 from the control signal circuit 20 in FIG. 2, or 20' in FIG. 3, or corresponding comparison and control means 4 in FIG. 1. In addition, the delaying elements 31-39 are each supplied with a binary control signal b1-b9 from their respective register output on the shift register. The delaying elements 41, 43 and 44 are supplied with a binary control signal with the logical value 1, while the delaying elements 42, 45 and 46 are supplied with a binary control signal with the logical value 0. The clock signal CL is supplied to the whole and half period delaying elements.

The shift register 40 has two register inputs of which the lefthand one is supplied a binary signal with logical value 0 and the righthand one a binary signal with the logical value 1. The shift register has a lefthand shift input connected to the output of the OR gate 52 and a righthand shift input connected to the output of the OR gate 53. In addition, the shift register has an output for binary control signal connected to a control input on the switch 51.

The shift register has just as many register positions for storing a binary number as the number of delaying elements 31-39. For each register position the register has an output connected to the binary control input of one of the delaying elements 31-39. The binary control signal bx to a given delaying element has the same logical value, i.e. 0 or 1, which is stored in the corresponding register position x. The collective delay in the delaying elements 31-39 therefore depends on the number of zeros and ones in the shift register. By shifting into the left more ones from the righthand register input, or shifting into the right more zeros from the lefthand register input, the total delay in the delaying elements 31-39 can be changed stepwise in equal time steps.

In brief the difference between the embodiments of FIGS. 2 and 3 could be summarized in the following way. In FIG. 2 the delay means comprises two delay devices delaying different pulses from the pulse shaper. In FIG. 3 the delay means comprises only one delay device used in time division multiplex for delaying different pulses from the pulse shaper.

Data signals which are to be restored are supplied to the signal input of the delaying element 31. The second shift logic 50 has three inputs for delayed data signals connected to the signal outputs on the delaying elements 42, 44 and 46. Due to the three groups, each with two series-connected delaying elements, being supplied different combinations of binary control signals, the data signals on the three inputs of the shift logic 50 will be mutually time shifted one time step. The data signals on the input which is connected to the signal output to the delaying element 42 will arrive one time step before corresponding data signals arriving at one of the remaining input, but one time step after corresponding data signals arriving on the other of the remaining inputs of the step shift logic 50.

The step shift logic 50 has a first output connected to an input on the OR gate 52 and a second output connected to an input of the OR gate 53. The step shift logic senses the data signals on its three inputs at first sensing times $t_s$ determined by the clock signal, and compares the results of corresponding sensings. When corresponding sensing of all three data signal give the same binary result, the step shift logic does not generate a shift pulse on any of its outputs. On the other hand, when the result of sensing one of the data signals received from the delaying element 44 or 46 differs from the results of sensing corresponding data signals on both remaining inputs, the step shift logic generates a shift pulse on either of its outputs. On which output a pulse is generated depends in such a case on which of the sensings gives a binary result which is different from both the others.

Figure 5:
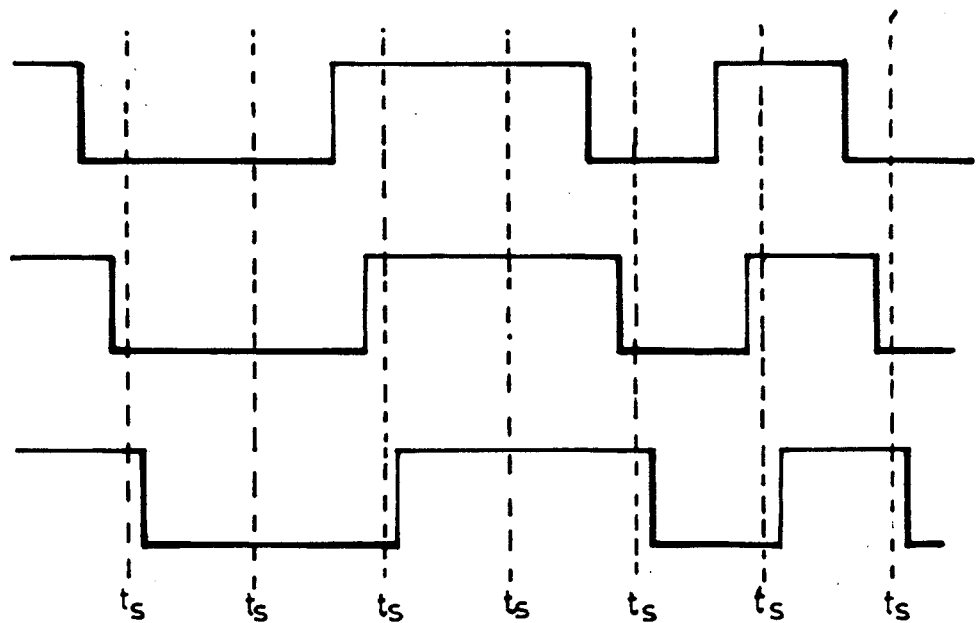

The step shift logic sensing is illustrated in FIG. 5. Sensing of all three binary data signals takes place simultaneously at the sensing times $t_s$. The data signals occur on the respective input from right to left, i.e. the uppermost data signal in FIG. 5 is time shifted one time step after the middle data signal, while the bottommost data signal is time-shifted one time step before the middle data signal. To obtain a clear figure, the magnitude of the time steps has been exaggerated in relation to the clock signal period time.

The sensing times $t_s$ are not centered in relation to the changeovers between different binary values in the middle data signal. This, in combination with the upper and lower data signals being time shifted in relation to the middle data signal means that the result of sensing the lower data signal deviates in certain cases from the result of corresponding sensing of the middle data signal. On the other hand, the result of sensing the upper data signal agrees at all $t_s$-times with the result of corresponding sensing of the middle data signal. By observing FIG. 5, it will be immediately understood that if all data signals could be shifted somewhat to the left in FIG. 5 relative the sensing times, i.e. if all data signals could be delayed a little further, then the result of the sensings of the bottommost data signal would always agree with the result of sensing the middle data signal. Such a further delay is just what the second shift logic achieves. This further delay means that the sensing times $t_s$ determined by the clock signal are centered at least to a certain extent, in relation to the transitions between different binary values in the middle data signal. This can also be expressed by saying that the middle data signal is phased in towards the sensing times determined by the clock signal.

Figure 6:
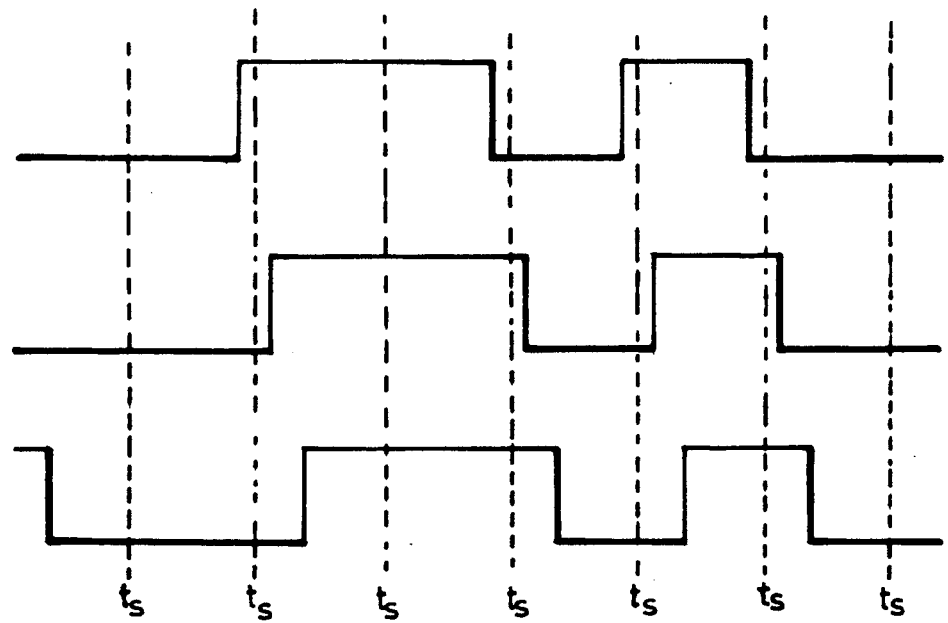

FIG. 6 illustrates the sensing of three data signals which are delayed compared with the data signals in FIG. 5. Neither are the sensing times $t_s$ centered here in relation to the transitions between different binary values of the middle data signal. This in combination with that the upper and the lower data signals are time shifted in relation to the middle data signal means that the result of sensing of the upper data signal deviates in certain cases from the result of corresponding sensing of the middle data signal. On the other hand, the result of sensing the bottom data signal at all $t_s$-times agrees with the result of corresponding sensing of the middle data signal. By observing FIG. 6 it will be immediately understood that if all data signals could be shifted somewhat to the right in the Figure relative the sensing times $t_s$, i.e. if the delay of all data signals could be reduced somewhat, then the result of sensing the uppermost data signal at any $t_s$-time would always agree with the result of sensing the middle data signal. Such a decrease in delay of the data signals is just what the second shift logic achieves. This reduction means that the sensing times $t_s$ determined by the clock signal are at least to a certain extent centered in relation to the transitions between different binary values in the middle data signal. This can also be expressed by saying that the middle data signal is phased in towards the sensing times determined by the clock signal.

The phasing of the data signal described above functions well for data signals which have a pulse ratio which is approximately one. On the other hand, there can be problems if the data signal pulse ratio heavily deviates from one. For remedying these problems, the means in FIG. 4 have a first shift logic 49 for increasing or decreasing delay in the elements 31-39 by just as many time steps as correspond to half a clock signal period.

The first shift logic 49 has three inputs for delayed data signals connected to the signal outputs of delaying elements 42, 47 and 48. The delays in elements 47 and 48 amount to a whole and a half clock signal period, respectively. The signals on the inputs of the shift logic 49 will therefore be mutually time-shifted by a half and a whole clock signal period, respectively. The shift logic senses the data signals on its three inputs at sensing times determined by the clock signals, and compares the binary results of corresponding sensings with each other. Where corresponding sensings of all three data signals give the same binary results, the shift logic 49 does not generate any shift pulse on its output connected to the switch 51. When the result of sensing the data signal from the delaying element 48 agrees with the result of corresponding sensing of either the data signal from the element 42 or 47, the shift logic 49 does not generate any shift pulse either. On the other hand, if the result of sensing the data signal from the delaying element 47 agrees with the result of sensing the data signal from the element 42, but the result of sensing the signal from the element 48 differs from both the others, the shift logic generates a number of shift pulses on its output. The number of shift pulses which are then generated agrees with the number of time steps corresponding to a half clock signal period. Thus, if eight time steps correspond to a complete clock signal period, the shift logic 49 generates four shift pulses in appropriate cases.

In response to a binary control signal from the shift register, the switch 51 expedites possible shift pulses either via a first output to the OR gate 52 or via a second output to the OR gate 53. The binary control signal from the shift register has one binary value if more than half of the shift register positions have stored a one and the opposite binary value if less than half of such positions have stored a one. If more than half of the position have stored a one, the pulses from the shift logic 49 will therefore result in that the shift register is shifted to the right as many steps that the delay in the element 31-39 increase by a half clock signal period. On the other hand, if less than half of the positions have stored a one, pulses from the shift logic will result in the shift register shifting to the left as many steps as the collected delay in the delaying elements 31-38 decreases by half a clock signal period.

Figure 7:
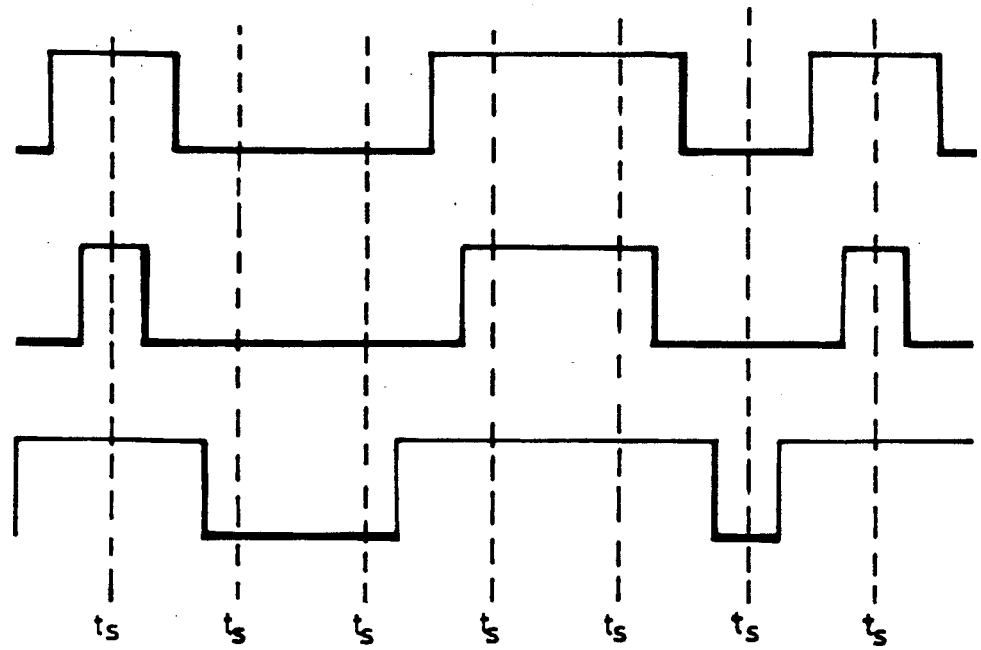
FIGS. 7-8 illustrate sensing data signals having different pulse ratios.

In FIG. 7 there is illustrated sensing of three data signals at the sensing times $t_s$. The uppermost data signal has the pulse ratio 1 and its transitions between logical levels are centered in relation to the sensing times. The middle data signal corresponds to the uppermost one, but it is distorted so that it has shorter duration for the higher level and longer duration for the lower level. Its pulse ratio therefore deviates substantially from one. The bottom data signal also corresponds to the uppermost one, but is distorted so that it has longer duration for the higher level and shorter duration for the lower level. Its pulse ratio therefore also deviates substantially from one.

It will be seen from FIG. 7 that sensing the distorted data signals gives the same result as for the undistorted signal when the sensing times $t_s$ are centered in relation to the transitions between different logical levels of the signals.

Figure 8:
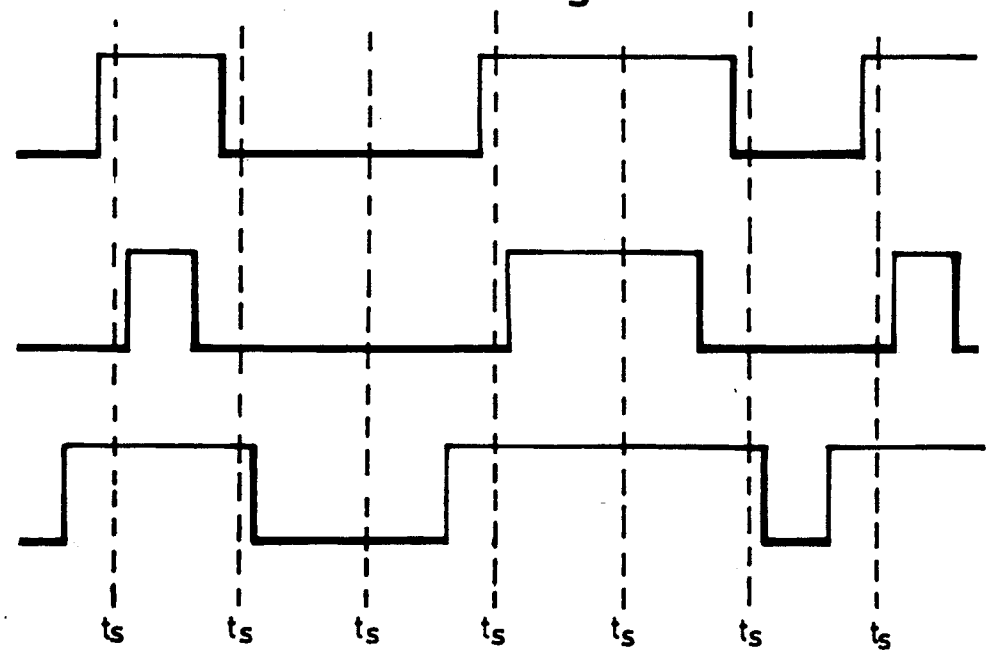

In FIG. 8 there is illustrated sensing of three data signals corresponding to those in FIG. 7, but time-shifted so that the sensing times $t_s$ are not centered in relation to the transitions between different logical levels of the signals. For the data signal with the pulse ratio one there is obtained the same sensing result as in FIG. 7. On the other hand, an incorrect result is obtained for the distorted signals at certain sensing times. If all the data signals in FIG. 8 could be time-shifted by half a clock signal period, the sensing result would be correct for all three signals. Such a time shift by half a clock signal period is just what the first shift logic 49 achieves.

Figure 9:
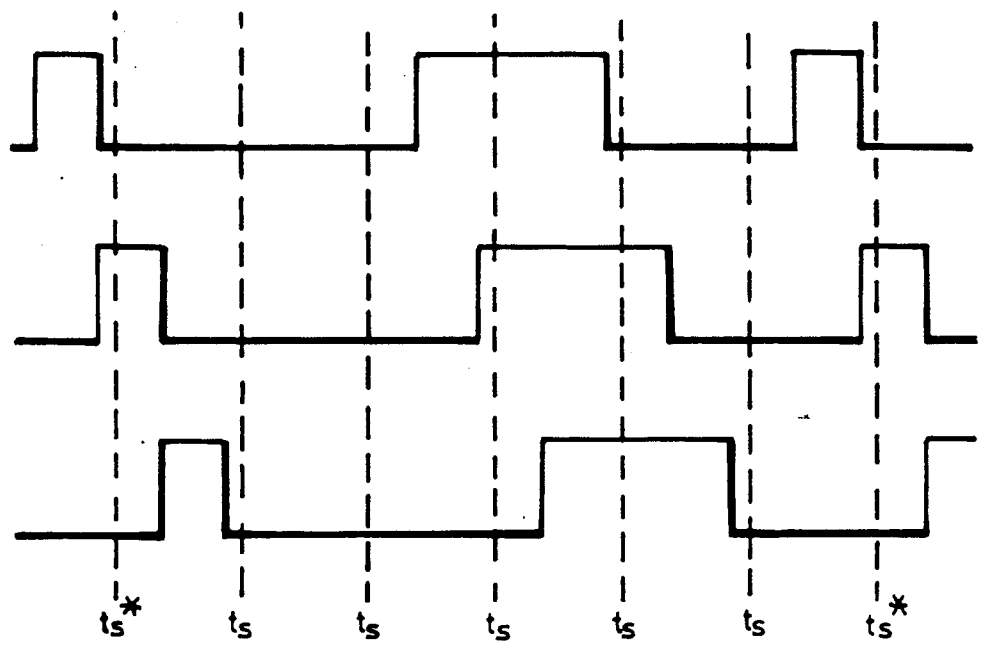
FIGS. 9-10 illustrate sensing data signals having a pulse ratio which deviates heavily from one and which are differently delayed.
Figure 10:
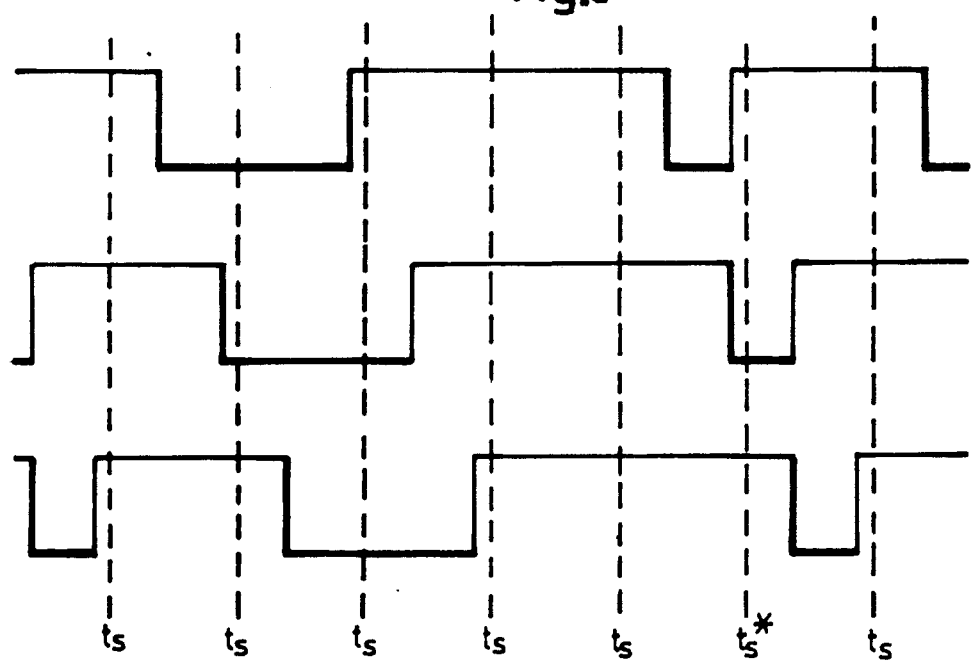

FIGS. 9 and 10 illustrate data signals sensing by the first shift logic. The signals in FIG. 9 all correspond to the middle signal in FIG. 7 or 8 and are mutually time-shifted by half a clock signal period. All the signals in FIG. 10 correspond to the bottom signal in FIG. 7 or 8 and are mutually time-shifted by half a clock signal period. At the sensing times $t^*_s$ there is obtained a different result differing from the sensing of the middle data signal than from the simultaneously sensed uppermost and bottom signals. This differing result is utilized by the first shift logic 49 as a criterion for the need of changing the delay by half a clock signal period.

Figure 11:
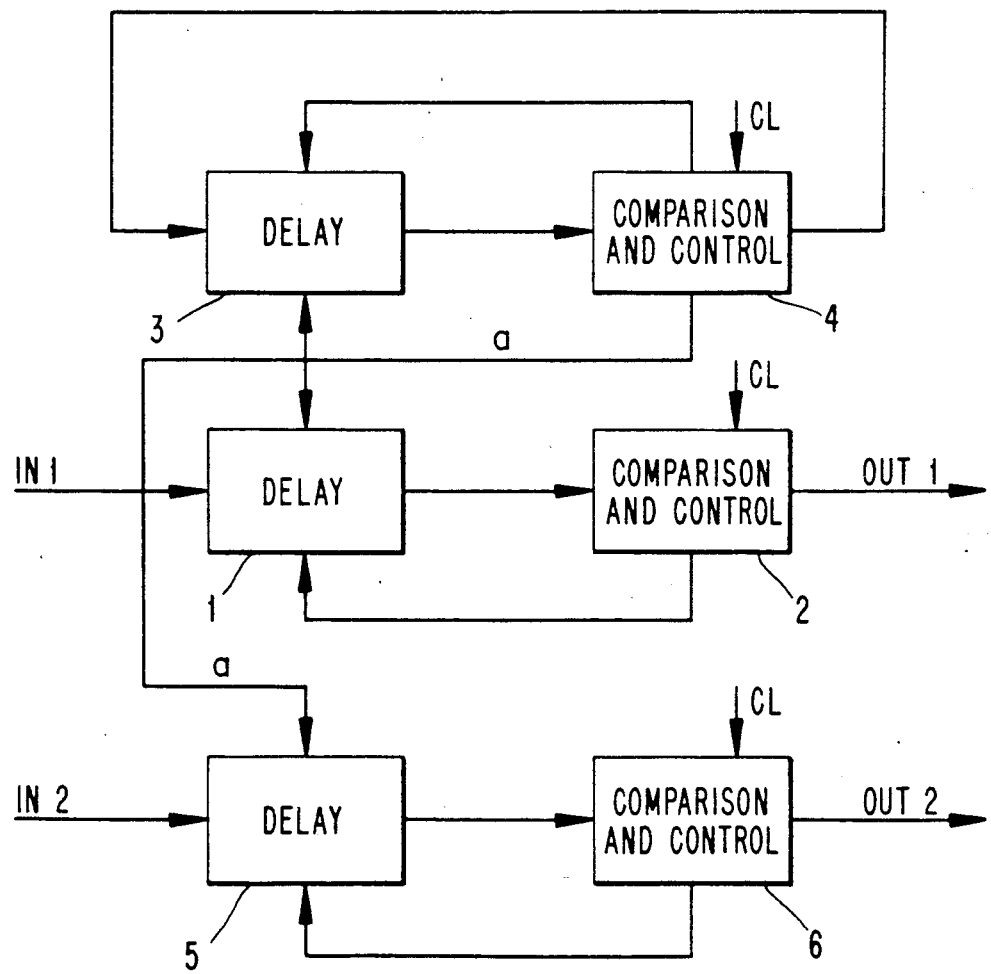
FIG. 11 illustrates an apparatus for carrying out restoration of several data signals in accordance with the invention.

In FIG. 11 there is illustrated an apparatus for also restoring a second data signal and phasing in this signal relative to the clock signal CL. The apparatus according to FIG. 8 differs from that according to FIG. 1 by a third signal delay means 5 and by third sensing and comparison and control means 6. The means 5 and 6 function individually and together in the same way as the means 1 and 2, but regenerate a second data signal received on the input IN2. The third signal delay means 5 receives on its second control input the same analogue control signal a from the means 4 as the first and second signal delay means. The means 1-6 are preferably designed as a part of a common VLSI circuit.

The invention is not limited to the above-described embodiments or to what is illustrated in the Figures. For example, it is conceivable to relate the time step magnitude to the clock signal period time using somewhat different means and in a somewhat different way than in accordance with FIG. 2 or 3. The number of delaying elements does not need to be the same in the first and second signal delaying means, and the number can be more than nine or less than eight. The first shift logic can include logical circuits with a filtering function. The shift logic does not then immediately generate a number of shift points as soon as the result of sensing the data signal from the delaying element 48 differs from the result of sensing both remaining signals. Instead, the shift logic then generates the shift pulses only after the results of the sensing have differed more than once in a predetermined manner, e.g. for three successive sensings.

It is conceivable per se that the second shift logic also has logical circuits with a similar filtering function as the first shift logic. Further modifications are conceivable within the scope of the invention.

I claim:

1. An apparatus for regenerating at least a first data signal and phasing the first data signal in relation to an available periodic clock signal, comprising:
   a first signal delay means which receives said first data signal and delays said first data signal a time delay, said time delay being controllable with substantially equal time increments by a first control input and the magnitude of said time increments being controllable by a second control input;
   a first comparison and control means, which receives said delayed first data signal from said first signal delay means, for sampling said data signal at a plurality of sample times, and controlling the number of increments in the signal delay of said first signal delay means by generating said first control input of the first signal delay means based on the results of comparisons of said samples;
   a second signal delay means which receives an input signal and delays said signal a time delay, said time delay being controllable with substantially equal time increments by a first control input and the magnitude of said time increments being controllable by a second control input, said second control input being the same as said second control input of said first signal delay means; and
   a second comparison and control means, which compares the magnitude of the time increments in said second signal delay means with the magnitude of at least part of the clock signal time period and generates said second control inputs of both the first and second signal delay means to control the magnitude of the time increments of both the first and second signal delay means synchronously, wherein said time increments of said first and second signal delay means have substantially similar responses to ambience factors.

2. An apparatus according to claim 1 wherein the magnitudes of the time increments of said first and second signal delay means constitute phase differences between two related signals which are a product of the clock signal and differing delayed amounts of said second signal delay means.

3. An apparatus according to claim 1 further including means for creating first and second related signals from the clock signal, said related signals having a period time and a mutual phase position responsive to the clock signal period time, connected to said second signal delay means which delays the first related signal a given number of time increments in relation to the second related signal, wherein said second comparison and control means receives the delayed related signals and compares their phases and based on the results of said phase comparison controls the magnitude of the time increments in the first and second signal delay means.

4. An apparatus according to claim 1, said first delay means including at least two delay devices said second delay means including at least two delay devices similar to the delay devices in said first delay means with time increments of substantially the same magnitude and response to at least one ambience factor being provided to said second delay means by means for creating first and second related signals from the clock signal, said related signals having a period time and a mutual phase position responsive to the clock signal period time, wherein said first and second delay means each delay their respective related signal by time delays differing by a given number of time increments, said second comparison and control means receives the delayed related signals and compares their phases and based on the results of said phase comparison controls the magnitude of the time increments in the first and second signal delay means.

5. An appartus according to claim 1 which additionally regenerates a second data signal and phases said second data signal in relation to the available periodic clock signal further comprising:
 a third signal delay means which receives said second data signal and delays the second data signal a time delay, said time delay being controllable with substantially equal time increments by a first control input and the magnitude of said time increments being controllable by a second control input, said second control input being the same as said second control inputs of said first and second delay means wherein the magnitude of said time increments in said third signal delay means are synchronous with said time increments in said first and second signal delay means; and
 a third comparison and control means, which receives said delayed second data signal from said third signal delay means, for sampling said data signal at a pluarlity of sample times and controlling the number of increments in the signal delay of said third signal delay means by generating said first control input of the third signal delay means based on the results of comparisons of said sampling.

6. An apparatus according to claim 1 wherein the signal delay means are common integrated circuits which are supplied with energy from a common voltage source.

7. An apparatus according to claim 1 which regenerates an additional plurality of data signals and phases said data signals in relation to the available periodic clock signal further comprising:
 a plurality of signal delay means which each receive a respective one of said data signals and delays said respective one of said data signals a time delay, said time delay being controllable with substantially equal time increments by a first control input and the magnitude of said time increments being controllable by a second control input, said second control input being the same as said second control inputs of said first and other of the plurality of delay means and generated by said second comparison and control means wherein the magnitude of said time increments in said plurality of signal delay means are synchronous with said time increments in said first and second signal delay means; and
 a plurality of comparison and control means, which receive one of said respective delayed data signals from a respective one of the plurality of signal delay means, for sampling said respective data signals at a plurality of sample times, and controlling the number of increments in the signal delay of said respective signal delay means by generating said first control input of said respective signal delay means based on the results of comparisons of said sampling.

8. A method for regenerating a first data signal and phasing the first data signal in relation to an available periodic clock signal comprising the steps of:
 delaying said data signal a time delay at a first signal delay means;
 controlling said time delay by substantially equal time increments;
 adjustably controlling the magnitude of said time increments;
 sampling said data signal at a plurality of sample times determined by the clock signal and creating a first restored data signal;
 comparing said samples of the data signal;
 controlling the number of increments in the signal delay of said first signal delay means based on the results of the comparison;
 delaying a reference input signal at a second signal delay means a second time delay;
 controlling said second time delay by substantially equal time increments;
 relating the magnitude of the time increments in said second signal delay means with the magnitude of at least part of the clock signal time period; and
 controlling the magnitude of the time increments of both the first and second signal delay means to be the same and synchronous, wherein said time increments of said first and second signal delay means have substantially similar responses to ambience factors.

9. A method according to claim 8 where the step of relating the magnitude of the time increments with the magnitude of the clock signal time period results in a fixed relationship between the magnitude of each time increment and the magnitude of the clock period.

10. A method according to claim 8 wherein the step of relating further includes the step of creating two related signals from the clock signal and differing delay amounts of the second signal delay means, one related signal being delayed a given number of time increments in relation to the second related signal, wherein after the delay a mutual phase position exists between the phases of the related signals.

11. A method according to claim 8 wherein the step of relating further includes the step of creating a first and a second related signal from said clock signal, said related signals having a given period time and a mutual phase position in response to the clock signal period time, by delaying the first related signal a given number of time increments in relation to the second related signal, comparing the phases of the related signals after the delay, and controlling the magnitude of a time increment so that a given mutual phase position exists between the related signals after the delay.

12. A method according to claim 8 wherein said first delay means including at least two delay devices said second delay means including at least two delay devices similar to the delay devices in said first delay means with time increments of substantially the same magnitude and response to at least one ambience factor being provided to said second delay means by means for creating first and second related signals from the clock signal, said related signals having a period time and a mutual phase position responsive to the clock signal period time, further including the steps of:
- delaying the first and second related signals with the respective said first and second delay means by time delays differing by a given number of time increments;
- receiving the delayed related signals at said second comparison and control means and comparing their phases; and
- controlling the magnitude of the time increments in the first and second signal delay means based on the results of said phase comparison.

13. A method according to claim 8 which additionally regenerates a second data signal and phases said second data signal in relation to the available periodic clock signal including a third signal delay means and a third comparison and control means further including the steps of;
- delaying said second data signal received at said third signal delay means;
- controlling said time delay by substantially equal time increments;
- adjustably controlling the magnitude of said time increments wherein the magnitude of said time increments in said third signal delay means are synchronous with said time increments in said first and second signal delay means;
- sampling said data signal at a plurality of sample times determined by the clock signal and creating a second restored data signal;
- comparing said sampling at given sample times; and
- controlling the number of increments in the signal delay of said third signal delay means by generating said first control input of the third signal delay means based on the results of comparing said samples.

* * * * *